(12) United States Patent
Dwyer et al.

(10) Patent No.: US 12,123,893 B2
(45) Date of Patent: Oct. 22, 2024

(54) SENSOR HAVING STRESS RELIEVING SUPPORT STRUCTURE

(71) Applicant: Honeywell International Inc., Charlotte, NC (US)

(72) Inventors: Paul W. Dwyer, Seattle, WA (US); Stephen F. Becka, North Bend, WA (US)

(73) Assignee: Honeywell International Inc., Charlotte, NC (US)

( * ) Notice: Subject to any disclaimer, the term of this patent is extended or adjusted under 35 U.S.C. 154(b) by 0 days.

(21) Appl. No.: 17/820,127

(22) Filed: Aug. 16, 2022

(65) Prior Publication Data

US 2024/0061012 A1    Feb. 22, 2024

(51) Int. Cl.
| | |
|---|---|
| *G01P 15/13* | (2006.01) |
| *G01P 1/00* | (2006.01) |
| *G01P 1/02* | (2006.01) |
| *G01P 15/08* | (2006.01) |

(52) U.S. Cl.
CPC ............ *G01P 15/132* (2013.01); *G01P 1/006* (2013.01); *G01P 1/023* (2013.01); *G01P 15/0802* (2013.01)

(58) Field of Classification Search
CPC .... G01P 15/132; G01P 15/0802; G01P 1/023; G01P 1/006
See application file for complete search history.

(56) References Cited

U.S. PATENT DOCUMENTS

| | | | |
|---|---|---|---|
| 3,152,485 A | 10/1964 | Lones et al. | |
| 3,601,343 A * | 8/1971 | Sivaslian | G02B 7/18 248/467 |
| 4,555,944 A * | 12/1985 | Hanson | B23P 11/02 73/431 |
| 4,555,945 A * | 12/1985 | Hanson | B23P 11/025 73/431 |
| 4,697,455 A | 10/1987 | Norling | |
| 5,097,172 A * | 3/1992 | Becka | G01P 1/006 310/348 |

(Continued)

FOREIGN PATENT DOCUMENTS

| | | |
|---|---|---|
| CN | 104400236 A | 3/2015 |
| WO | 8706350 A | 10/1987 |

OTHER PUBLICATIONS

Hsieh et al., "A novel stress isolation guard-ring design for the improvement of a three-axis piezoresistive accelerometer," Journal of Micromechanics and Microengineering, vol. 21, Sep. 7, 2011, 11 pp.

(Continued)

*Primary Examiner* — Helen C Kwok
(74) *Attorney, Agent, or Firm* — Shumaker & Sieffert, P.A.

(57) ABSTRACT

An example transducer includes an upper magnetic circuit assembly including an upper excitation ring, a lower magnetic circuit assembly including a lower excitation ring, and a proof mass assembly positioned between the upper and lower magnetic circuit assemblies. A coefficient of thermal expansion (CTE) of the proof mass assembly is lower than a CTE of each of the upper and lower excitation rings. The transduces also includes an outer support structure coupled to an outer surface of each of the upper and lower excitation rings, and the outer support structure includes at least one cutout configured to reduce a circumferential stiffness of the outer support structure.

20 Claims, 4 Drawing Sheets

(56) References Cited

U.S. PATENT DOCUMENTS

| | | | |
|---|---|---|---|
| 5,182,949 A * | 2/1993 | Rupnick | G01P 15/132 |
| | | | 73/514.01 |
| 5,212,984 A * | 5/1993 | Norling | G01D 11/30 |
| | | | 73/497 |
| 6,634,231 B2 | 10/2003 | Malametz | |
| 7,024,933 B2 | 4/2006 | Malametz | |
| 7,412,888 B2 | 8/2008 | Chu et al. | |
| 10,180,445 B2 | 1/2019 | Dwyer et al. | |
| 10,401,378 B2 | 9/2019 | Dwyer et al. | |
| 10,859,593 B2 | 12/2020 | Dwyer et al. | |
| 11,169,175 B2 | 11/2021 | Dwyer et al. | |
| 2017/0115321 A1* | 4/2017 | Dwyer | G01P 15/125 |
| 2021/0172974 A1* | 6/2021 | Dwyer | B23K 26/21 |
| 2021/0246557 A1 | 8/2021 | Dwyer et al. | |
| 2022/0018872 A1* | 1/2022 | Dwyer | G01P 15/125 |

OTHER PUBLICATIONS

Extended Search Report from counterpart European Application No. 23188427.1 dated Jan. 23, 2024, 7 pp.

Response to Extended Search Report dated Jan. 23, 2024, from counterpart European Application No. 23188427.1 filed Mar. 27, 2024, 7 pp.

* cited by examiner

SENSOR HAVING STRESS RELIEVING SUPPORT STRUCTURE

TECHNICAL FIELD

The present disclosure relates to systems and techniques for relieving stress on transducers.

BACKGROUND

A transducer may detect a directional stimulus along an input axis and translate that stimulus into a measurement signal. The transducer may detect the directional stimulus by detecting displacement of a proof mass assembly along the input axis. The proof mass assembly may be positioned between two magnetic circuit assemblies that each produce a magnetic field, and coils on the proof mass assembly may interact with the magnetic field. During operation, the proof mass assembly may experience stresses caused by mechanical distortion or by differential thermal expansion that reduce an accuracy of the transducer. These stresses may cause deviations in displacement of the proof mass assembly and, as a result, deviations in the output of the transducer.

SUMMARY

Stress-relieving outer support structures described herein, e.g., bellybands, may be utilized as part of a sensor to improve accuracy of the sensor. An outer support structure is configured couple to the upper and lower excitation rings of the transducer and to maintain an axially compressive preload force holding the upper and lower excitation rings axially together with at least a portion of a proof mass assembly positioned between the upper and lower excitation rings. The outer support structure is further configured to retain a separation distance, or capacitive gap, between the upper and lower excitation rings, e.g., via the axially compressive preload force. The outer support structure is further configured reduce and/or minimize radial stresses on the transducer, e.g., to reduce and/or minimize hoop stresses applied to the upper and lower excitation rings by the outer support structure and/or a coupling agent used to couple the outer support structure to the upper and lower excitation rings. In some examples, the outer support structure comprises one or more cutouts that reduce the circumferential stiffness of the outer support structure without substantially changing the coupling of the outer support structure to the upper and lower excitation rings and without substantially changing the axially compressive preload force. The reduced stiffness of the outer support structure reduces radial hoop stresses applied to the transducer by the outer support structure, e.g., due to mismatches in the coefficient of thermal expansion (CTE) between any or all of the outer support structure, a coupling agent (e.g., an epoxy), the upper and lower excitation rings, and the proof mass assembly. A transducer incorporating a outer support structure including one or more circumferential stiffness-reducing cutouts, slots, slits, and/or gaps discussed herein may have increased accuracy.

In one example, this disclosure describes a transducer including: an upper magnetic circuit assembly comprising an upper excitation ring; a lower magnetic circuit assembly comprising a lower excitation ring; a proof mass assembly positioned between the upper and lower magnetic circuit assemblies, wherein a coefficient of thermal expansion (CTE) of the proof mass assembly is lower than a CTE of each of the upper and lower excitation rings; and an outer support structure coupled to an outer surface of each of the upper and lower excitation rings, wherein the outer support structure includes at least one cutout configured to reduce a circumferential stiffness of the outer support structure.

In another example, this disclosure describes a bellyband including: an outer support structure configured to couple to an outer surface of each of an upper excitation ring and a lower excitation ring of a transducer comprising a proof mass assembly positioned between the upper and lower excitation rights, wherein a coefficient of thermal expansion (CTE) of the proof mass assembly is lower than a CTE of each of the upper and lower excitation rings, wherein the outer support structure includes at least one cutout configured to reduce a circumferential stiffness of the outer support structure.

The details of one or more examples are set forth in the accompanying drawings and the description below. Other features, objects, and advantages will be apparent from the description, drawings, and claims.

BRIEF DESCRIPTION OF THE FIGURES

The details of one or more examples are set forth in the accompanying drawings and the description below. Other features, objects, and advantages will be apparent from the description and drawings, and from the claims.

DETAILED DESCRIPTION

Figure 1:
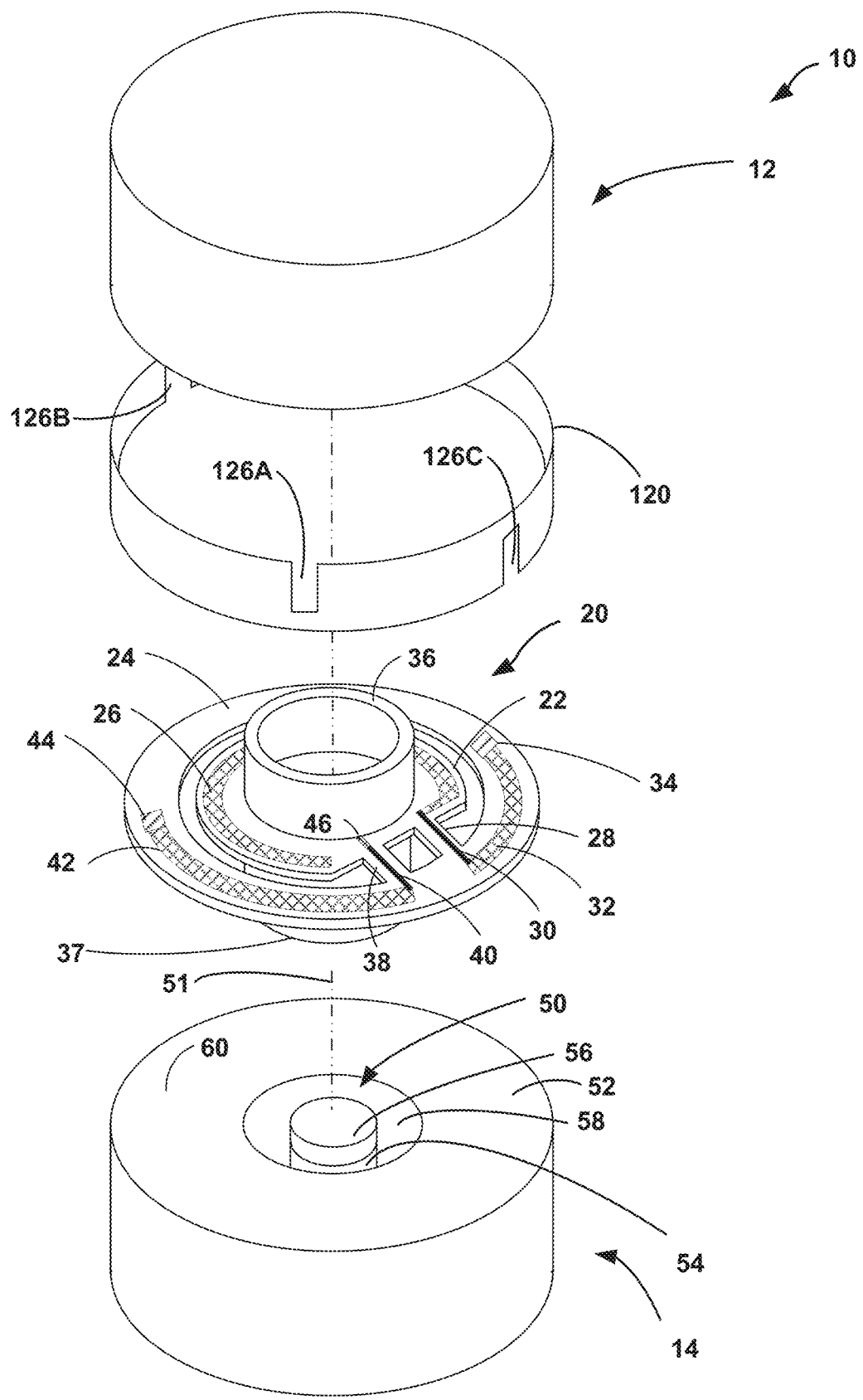
FIG. 1 is an exploded view diagram illustrating an example transducer including an example stress-relieving support structure.

FIG. 1 is an exploded view diagram illustrating an example transducer 10 (e.g., a force-rebalance accelerometer) including an example stress relieving support structure 120. In the example shown, transducer 10 includes an upper magnetic circuit assembly 12, a lower magnetic circuit assembly 14 (e.g., collectively "upper and lower magnetic circuit assemblies 12 and 14"), and a proof mass assembly 20 positioned between upper and lower magnetic circuit assemblies 12 and 14. Proof mass assembly 20 may include a proof mass 22, a proof mass support structure 24, and a first flexure 28 and a second flexure 38 (collectively "flexures 28 and 38") flexibly connecting proof mass 22 to proof mass support structure 24.

Transducer 10 defines input axis 51. Transducer 10 is configured to detect a movement stimulus along input axis 51. In the example of FIG. 1, transducer 10 is illustrated as a capacitive transducer that detects a change in capacitance in response to the movement stimulus, as will be described further below; however, transducer 10 may use one or more alternative or additional mechanisms to detect a movement stimulus along input axis 51. In the example of FIG. 1, transducer 10 has a generally cylindrical shape; however, in other examples, other shapes may be used.

Transducer 10 includes a proof mass assembly 20, and upper and lower magnetic circuit assemblies 12 and 14. The proof mass assembly 20 is disposed between upper and lower magnetic circuit assemblies 12 and 14. Upper and lower magnetic circuit assemblies 12 and 14 may each include an excitation ring, a permanent magnet, and a pole piece. Each excitation ring may include an inwardly facing surface that faces proof mass assembly 20 and interacts with (e.g., may be coupled to) portions of the proof mass assembly 20. Upper and lower magnetic circuit assemblies 12 and 14 are coupled by outer support structure 120, e.g., bellyband 120.

Proof mass support structure 24 may provide structural support for proof mass 22 and help maintain separation between proof mass 22 and upper and lower magnetic circuit assemblies 12 and 14. Although proof mass support structure 24 as shown in FIG. 1 is a circular shape, proof mass support structure 24 may be any shape (e.g., square, rectangular, oval, or the like) and may or may not surround proof mass 22. Proof mass 22 may be flexibly coupled to proof mass support structure 24 using one or more flexures 28 and 38 to support proof mass 22 within proof mass support structure 24 and enable proof mass 22 to move about the plane defined by proof mass support structure 24. For example, flexures 28 and 38 may be stiff in a radial direction (e.g., perpendicular to input axis 51) and flexible in a vertical direction (e.g., along input axis 51), such that flexures 28 and 38 allow proof mass 22 to move in a direction substantially orthogonal (e.g., orthogonal or nearly orthogonal) to a plane defined by proof mass support structure 24 due to acceleration of transducer 10. Proof mass support structure 24 may include mounting pads 34 and 44 and one or more electrical traces 32 and 42. Flexures 28 and 38 may contain one or more thin film leads 30 and 40 on an upper or lower surface of the respective flexure of flexures 28 and 38 configured to transmit an electrical signal across the respective flexure.

In the example of FIG. 1, proof mass assembly 20 may be clamped by magnetic circuit assemblies 12 and 14 at an outside diameter of proof mass assembly 20. Upper and lower magnetic circuit assemblies 12 and 14 may be attached (e.g., clamped) to opposite sides of proof mass assembly 20 using one or more of the respective mounting pads (e.g., mounting pads 34 and 44). Mounting pads 34 and 44 may be positioned at various locations on proof mass support structure 24, and may take on any form or shape and be present in any quantity. In some examples, mounting pads 34 and 44 may be raised such that when transducer 10 is fully assembled, mounting pads 34 and 44 may contact upper and lower magnetic circuit assemblies 12 and 14 to separate proof mass assembly 20 from upper and lower magnetic circuit assemblies 12 and 14, as well as provide mounting support for proof mass assembly 20. For example, a height of mounting pads 34 and 44 may define capacitive gaps between upper and lower magnetic circuit assemblies 12 and 14 and upper and lower capacitance pick-off plates (e.g., upper capacitance pick-off plate 26) on proof mass 22. Although two mounting pads are shown, proof mass assembly 20 may include more or fewer mounting pads, e.g., one mounting pad or three or more mounting pads.

Proof mass 22 may include one or more capacitance pick-off plates (e.g., upper capacitance pick-off plate 26) and one or more force-rebalancing coils mounted on upper (e.g., upper force-rebalancing coil 36) and/or lower (e.g., upper force-rebalancing coil 37) surfaces of proof mass 22. In some examples, upper capacitance pick-off plate 26 and upper force-rebalancing coil 36 may be configured to interact with upper magnetic circuit assembly 12 to measure the acceleration applied to transducer 10. For example, as acceleration is applied to transducer 10, proof mass 22 may deflect from a null position, causing a distance of the capacitance gap between upper capacitance pick-off plate 26 and the inwardly facing surface of upper magnetic circuit assembly 12 to change (e.g., increase or decrease), resulting in a change in a capacitance and, correspondingly, a change in a capacitance measurement. In some examples, the change in the capacitance may be used to determine the amount of acceleration applied to transducer 10.

Additionally or alternatively, transducer 10 may be configured to apply an electrical current to upper force-rebalancing coil 36 (e.g., through thin film lead 40) based on the change in the capacitance, such that upper force-rebalancing coil 36 in conjunction with a magnetic pole piece of upper magnetic circuit assembly 12 acts as a servo to maintain the position of proof mass 22 at a null position. A current applied to upper force-rebalancing coil 36 to maintain proof mass 22 at the null position may be used to determine an amount of directional stimulus, such as acceleration, applied to transducer 10. For example, a magnitude of the current to force-rebalancing coil 36 may be a measure of acceleration of proof mass 22 along input axis 51. While the disclosure describes the operation of transducer 10 in terms of upper capacitance pick-off plate 26 and upper force-rebalancing coil 36, such descriptions may equally apply to the use of a lower capacitance pick-off plate and lower force-rebalance coil, combinations of upper and lower capacitance pick-off plates and lower force-rebalance coils.

In some examples, components of proof mass assembly 20, such as proof mass support structure 24 and proof mass 22, may be made from a relatively low CTE material. A relatively low CTE material may be a material having a CTE less than or equal to about 3 ppm/° C. For example, proof mass assembly may be manufactured from fused silica and/or quartz having a CTE of about 0.5 ppm/° C.

Upper and lower magnetic circuit assemblies 12 and 14 each include a magnet assembly 50 and an excitation ring 52 (not labeled for upper magnetic circuit assembly 12). Magnet assembly 50 defines input axis 51 through transducer 10. Magnet assembly 50 includes a pole piece 56 and a magnet 54 underlying pole piece 56. In the example shown, magnet 54 is overlying excitation ring 52 (e.g., at least a portion of excitation ring 52 opposite inward facing surface 60 and within coil gap 58), and pole piece 56 is overlying magnet 54. Magnet 54 may be configured to provide a magnetic field to drive magnetic circuits of lower magnetic circuit assembly 14. In some examples, magnet 54 may be made of Alnico, samarium-cobalt, neodymium-iron-boron, or other such materials. In some examples, magnet 54 may be manufactured from a relatively high CTE material. A relatively high CTE material may have a CTE higher than a relatively low CTE material, such as a relatively low CTE material of upper base layer 68 or outer ring 62. A relatively high CTE material may be, for example, a material having a CTE greater than about 8 ppm/° C. For example, magnet 54 may be manufactured from alnico, having a CTE of about 11 ppm/° C.

Excitation ring 52 may be configured to provide a magnetic return path for the magnetic field generated by magnet 54. For example, excitation ring 52 may have a generally cylindrical shape with a "C" cross section. Pole piece 56 may be a magnetic structure that focuses a magnetic field created by magnet 54 to drive upper magnetic circuit assembly 12. For example, pole piece 56 may direct the magnetic field to flow through force-rebalancing coil 36. By directing the magnetic field through force-rebalancing coil 36, the magnetic field may enter excitation ring 52 and flow around to the opposite side of magnet 54 through excitation ring 52, and flow back through magnet 54 to pole piece 56, completing the magnetic circuit. In some examples, excitation ring 52 may be manufactured from materials having relatively high relative magnetic permeability, such as a maximum relative magnetic permeability greater than about 1500. In some examples, excitation ring 52 may be manufactured from materials that saturate at relatively high magnetic flux densities, such as greater than about 5000 gausses.

In some examples, upper and lower magnetic circuit assemblies 12 and 14 may include inwardly (i.e., toward proof mass assembly 20) facing surfaces 60 configured to interact with portions of proof mass assembly 20. Upper and lower magnetic circuit assemblies 12 and 14 may also include a coil gap 58 along a respective inwardly facing surface with magnet assembly positioned therein. Coil gap 58 may be configured to receive force-rebalancing coil 36 of proof mass assembly 20. In some examples, at least a portion of excitation ring 52 may be manufactured from a material having a relatively high relative magnetic permeability to provide a magnetic return path, such as invar or super invar.

The magnetic flux of magnetic circuit assemblies 12, 14 may vary along a magnetic return path. For example, portions of excitation ring 52 and pole piece 56 near an interface with magnet 54 and an outer radius of magnet 54 may experience higher magnetic flux than other parts of magnetic circuit assemblies 12 and 14. In some instances, a sufficiently high magnetic flux density may saturate, resulting in an uneven or unstable magnetic field with which proof mass assembly 20 may interact.

Bellyband 120 may be made of any suitable material for holding upper and lower magnetic circuit assemblies 12 and 14 together in the axial direction. For examples, bellyband 120 may be configured to retain an axial distance between each of the upper and lower magnet assemblies 12 and 14 and the proof mass assembly 20, e.g., via maintaining and/or achieving an axial pre-load force applied to upper and lower magnetic assemblies to hold them together with proof mass assembly 20 between them. In some examples, bellyband 120 may be a metal comprising nickel, e.g., invar, super invar, alloy 42, or the like. Bellyband 120 may be coupled to an outer surface of each of upper and lower magnetic circuit assemblies 12 and 14. For example, during assembly, upper and lower magnetic circuit assemblies 12 and 14 may be held and/or forced towards each other with proof mass assembly 20 between them and to couple to mounting pads 34, 44, with a first amount of axial compression force, e.g., a first axial pre-load force. An inner surface of bellyband 120 may have a diameter and/or dimension substantially similar to, or slightly larger than, the diameter and/or dimension of upper and lower magnetic circuit assemblies 12 and 14 and may be positioned and/or friction fit onto portions of the outer surfaces of both upper and lower magnetic circuit assemblies 12 and 14, as shown in FIG. 2A.

Figure 2A:
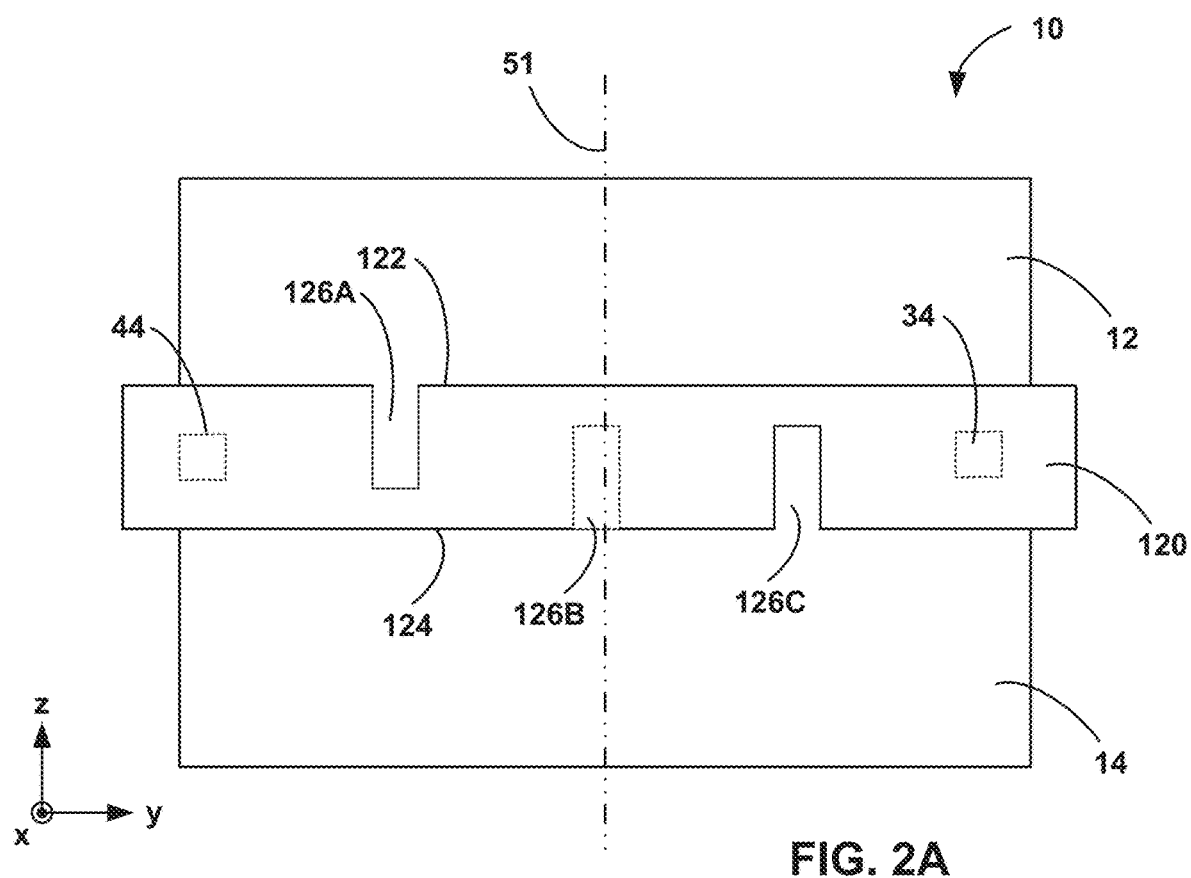
FIG. 2A is a side view diagram illustrating the example transducer and stress-relieving support structure of FIG. 1.

In some examples, bellyband 120 may be further adhered and/or attached to the outer surfaces of upper and lower magnetic circuit assemblies 12 and 14, for example, by application of an adhesive and/or epoxy that contacts both the outer surfaces of upper and lower magnetic circuit assemblies 12 and 14 and a surface of bellyband 120, e.g., along edges 122 and 124 of bellyband 120 (shown in FIG. 2A, and which may be shoulders of bellyband 120 extending radially from upper and lower magnetic circuit assemblies 12 and 14, e.g., the radial thickness of bellyband 120).

In some examples, bellyband 120 is coupled to outer surfaces of upper and lower magnetic circuit assemblies 12 and 14 by a thermally curable epoxy. For example, transducer 10 may be subjected to an elevated temperature during assembly to cure the epoxy, while upper and lower magnetic circuit assemblies 12 and 14 are held together with the first pre-load force. After thermal cure, transducer 10 may cool to room temperature or some nominal temperature of the environment in which transducer 10 is to be used. During cooling, bellyband 120 and upper and lower magnetic circuit assemblies 12 and 14 may shrink faster than proof mass assembly 20, e.g., due to a higher CTE than proof mass assembly 20. Bellyband 120 may shrink in the axial direction and increase the axial compression force of upper and lower magnetic circuit assemblies 12 and 14 on mounting pads 34, 44 of proof mass assembly 20, e.g., increasing the axial pre-load force. In some examples, transducer 10 is assembled taking into account the increase in pre-load force due to CTE mismatch between upper and lower magnetic circuit assemblies 12 and 14, bellyband 120, and proof mass assembly 20. For example, one or both of the first pre-load force and CTE of bellyband 120 may be configured to achieve a second axial pre-load force after assembly, epoxy thermal cure, and cool down of transducer 10 to ambient and/or the nominal in-use temperature. In some examples, the CTE of bellyband 120 may be controlled by controlling the amount of nickel content of bellyband 120.

In some examples, bellyband 120 may also shrink and/or change dimension in the radial direction and increase a radial hoop stress on any or all of upper and lower magnetic circuit assemblies 12 and 14 and proof mass assembly 20. Additionally, as the temperature of transducer 10 changes during use, e.g., due to environmental temperature change or otherwise heating and cooling of transducer 10, bellyband 120 may expand and shrink faster than any or all of upper and lower magnetic circuit assemblies 12 and 14 and proof mass assembly 20, thereby causing varying radial hoop stresses and increasing bias error and hysteresis in the response of proof mass 22. In other words, a CTE mismatch between bellyband 120 and any or all of upper and lower magnetic circuit assemblies 12 and 14 and proof mass assembly 20 may be useful and desirable for maintaining and/or achieving a desired axial pre-load force, but may also aggravate asymmetries of proof mass assembly 20 and/or entire transducer 10 via causing radial compressive and tensile strain on any or all of upper and lower magnetic circuit assemblies 12 and 14 and proof mass assembly 20.

Figure 4:
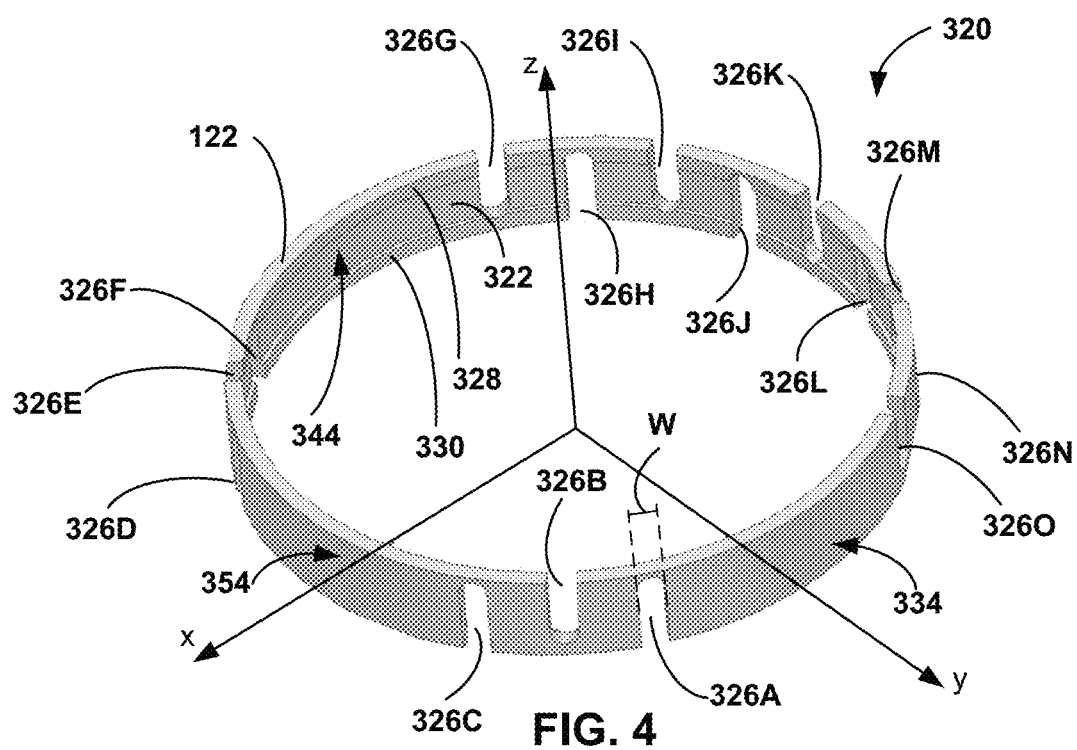
FIG. 4 is a perspective view diagram illustrating an example stress-relieving outer support structure.

In some examples, bellyband 120 may include one or more cutouts configured to reduce a circumferential stiffness of bellyband 120, thereby reducing radial compressive and tensile strain (e.g., reducing radial hoop stress) caused by bellyband 120 without significantly reducing the axial pre-load force maintained and/or achieved by bellyband 120. In the example shown in FIG. 1, bellyband 120 includes three cutouts 126A, 126B, and 126C (collectively, "cutouts 126). In the example shown, cutouts 126 are rectangular having a long dimensional in the axial direction, however, cutouts 126 may be any shape and may extend from an axial edge 122 and/or 124 of bellyband 120 or may be apertures and/or holes in bellyband 120, e.g., not extending from an edge. In some examples, cutouts 126 may be any shape, e.g., square, triangular, circular, elliptical, or any other shape. In examples in which bellyband 120 includes a plurality of cutouts 126, each of cutouts 126 may be the same or different. In the example shown, cutouts 126B and 126B extend from a first edge of bellyband 120 (e.g., the edge adjacent to lower magnetic circuit assembly 14 when assembled) and cutout 126A extends from a second, opposite edge of bellyband 120 (e.g., the edge adjacent to upper magnetic circuit assembly 12 when assembled). In some examples, cutouts 126 may extend from opposite axial edges of bellyband 120 in an alternating manner, e.g., as illustrated in FIG. 4.

Cutouts 126 may be formed in bellyband 120 in any suitable manner. In some examples, cutouts 126 may be formed via electrical discharge machining (EDM), cutting, grinding, stamping, ablating, or the like.

Figure 2B:
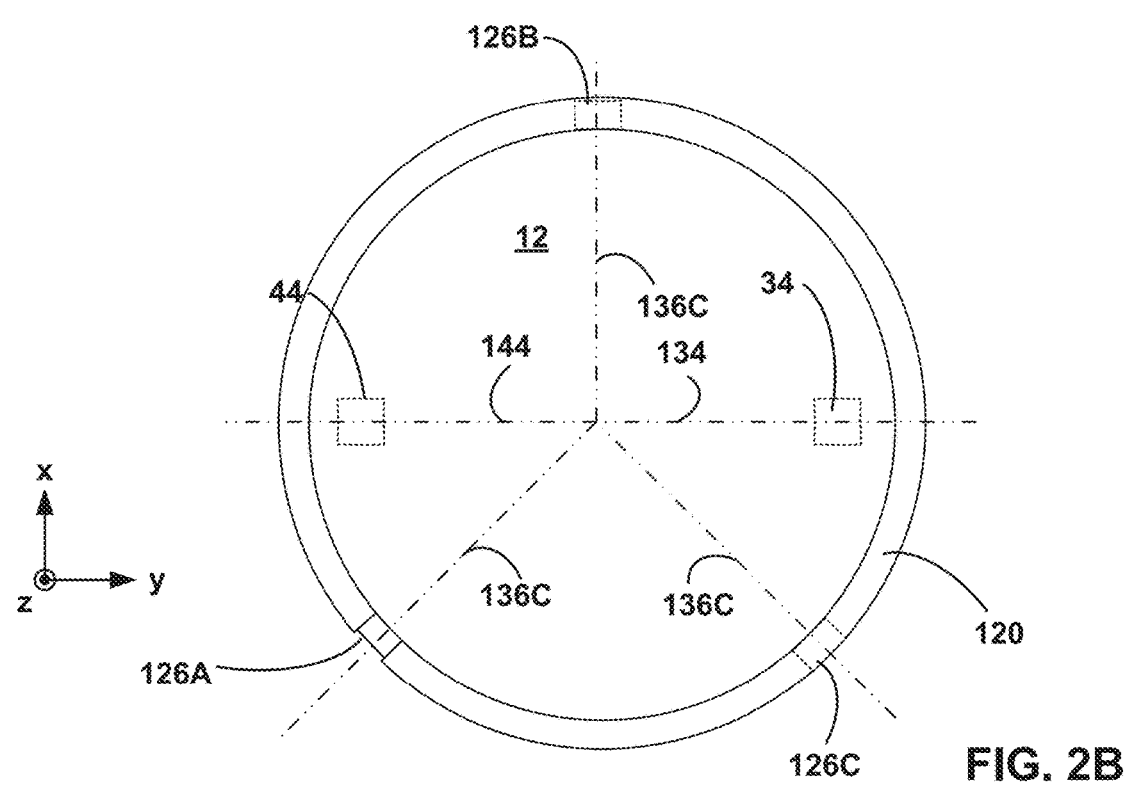
FIG. 2B is a top view diagram illustrating the example transducer and stress-relieving support structure of FIG. 2A.

FIG. 2A is a side view diagram illustrating transducer 10 and stress-relieving support structure 120 of FIG. 1, e.g., after assembly of transducer 10, and FIG. 2B is top view diagram illustrating transducer 10 and stress-relieving support structure 126 of FIG. 2A. In some examples, at the circumferential positions of mounting pads 34, 44, bellyband 120 is a solid bellyband, e.g., there is no cutout 126 at a circumferential position that substantially coincides with a circumferential position of a mounting pad, e.g., mounting pads 34, 44. In other words, at the circumferential positions of the mounting pads 34, 44, bellyband 120 is a solid material (e.g., without a cutout) to maintain its axial preload force at mounting pads 34, 44.

In the examples shown, mounting pads 44 and 34 (illustrated as dashed lines as internal to assemble transducer 10) are positioned such that they do not coincide with any of cutouts 126, e.g., in circumferential position. For example, bellyband 120 and/or cutouts 126 of bellyband 120 are positioned circumferentially such that none of cutouts 126 overlap with either of mounting pads 34 or 44, or align with mounting pads 34 or 44 along a radial line with mounting pads 34 or 44. For example, as shown in FIG. 2B, cutouts 126A, 12b, and 126C are positioned circumferentially to align with radial lines 136A, 136B, and 136C, respectively, and mounting pads 34 and 44 are positioned circumferentially to align with radial lines 134 and 144, respectively. Bellyband 126 and/or cutouts 126 are positioned such that none of cutouts 126 radially align with mounting pads 34, 44, e.g., none of radial lines 136 overlap with either of radial lines 124, 144. In some examples, transducer 10 includes a plurality of mounting pads (e.g., mounting pads 34, 44), and at least one cutout 126 is circumferentially positioned substantially equidistant between two mounting pads of the plurality of mounting pads 34, 44. In some examples, a plurality of cutouts 126 are circumferentially positioned substantially equidistant between two mounting pads of the plurality of mounting pads 34, 44.

Figure 3:
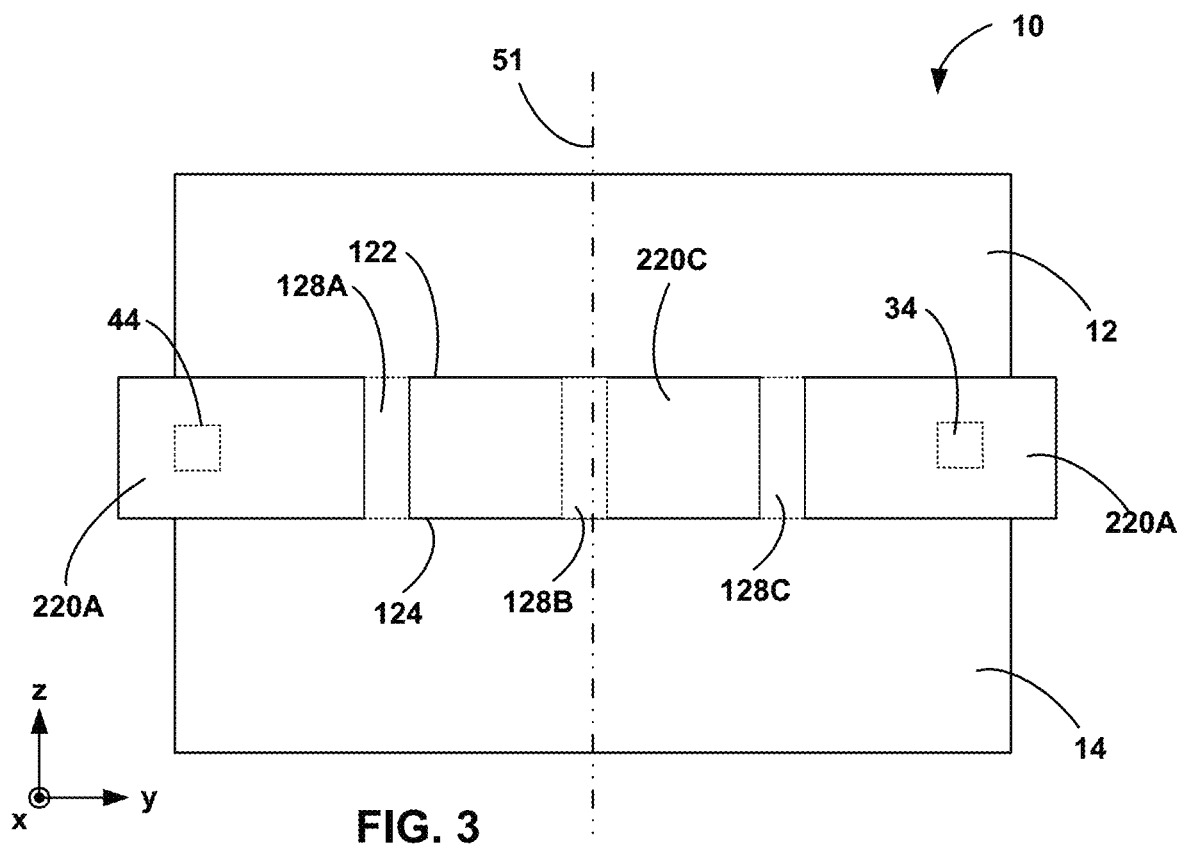
FIG. 3 is a side view diagram illustrating a transducer including another example stress-relieving outer support structure.

FIG. 3 is a side view diagram illustrating transducer 10 and another stress-relieving support structure 220, e.g., after assembly of transducer 10. In some examples, stress-relieving support structure 220, also referred to herein as bellyband 220, comprises a plurality of separate sections. In other words, bellyband 220 may be substantially similar to bellyband 120 only having slits 128 separating bellyband 220 into separate sections. In the example, bellyband 220 includes three slits 128A, 128B, and 128C separating bellyband 220 into three circumferential sections 120A, 120B, and 120C. In the example shown, a slits 128 of bellyband 120 does not coincide in circumferential position with a mounting pad 34 or 44 of transducer 10. In other words, bellyband 220 comprises a solid material (e.g., without a cutout) to maintain its axial preload force at the circumferential positions of mounting pads 34, 44.

FIG. 4 is a perspective view diagram illustrating an example stress-relieving outer support structure 320, also referred to herein as bellyband 320. In the example shown, bellyband 320 includes a plurality of cutouts 326A-3260 (collectively, "cutouts 326") distributed at circumferential positions about bellyband 320. In some examples, bellyband 320 may be used with a transducer having a plurality of mounting pads, e.g., three mounting pads, and bellyband 320 may be positioned on the transducer such that cutouts 326 do not coincide in circumferential position of the circumferential positions 334, 344, and 354 of the mounting pads of the transducer, e.g., similar to as described above.

In the example shown, bellyband 320 includes recess 322. Recess 322 is configured to give relief to a proof mass assembly of the transducer, e.g., to ensure that bellyband 320 does not contact the proof mass assembly that is position between the upper and lower magnetic circuit assemblies. Surfaces 328 and 330 of bellyband 320 are configured to contact the outer surfaces of the upper and lower magnetic circuit assemblies, respectively.

In the example shown, cutouts 326 extend from alternating axial sides/edges of bellyband 320. For example, a first cutout 326A extends from lower axial side/edge (e.g., opposite edge/shoulder 122) with an axial length that is less than the full axial length of bellyband 320 and a circumferential width W. A second, adjacent cutout 326B extends from upper axial side/edge, e.g., edge/shoulder 122) with an axial length that is less than the full axial length of bellyband 320 (and a circumferential width W, not shown in FIG. 4 for clarity of the illustration). First cutout 326A and second cutout 326B are separated by a circumferential distance without any intervening cuts, e.g., the edges from which adjacent cutouts 326A, 326B extend alternate. In other examples, all, none, or some of the plurality of cutouts 326 may alternate in which edge the cutouts extend from.

In some examples, all of cutouts 326 have the same axial length and the same circumferential width W, and in other examples, cutouts 326 may have axial lengths and circumferential widths W that are different from each other. In some examples, the axial length of cutouts 326 is at least 10% of the axial length of bellyband 320, or at least 25% of the axial length of bellyband 320, or at least 50% of the axial length of bellyband 320, or at least 75% of the axial length of bellyband 320, or at least 90% of the axial length of bellyband 320, but in all cases less than 100% of the axial length of bellyband 320. In some examples, width W may be any suitable width configured to reduce a circumferential stiffness of bellyband 320 and to reduce a hoop stress on a transducer assembled with bellyband 320, e.g., after cooling after thermal cure of an epoxy coupling bellyband 320 to upper and lower magnetic circuits at an elevated temperature. For example, width W is configured to allow bellyband 320 to flex such that the circumference of bellyband 320 may increase and/or decrease via width(s) W increasing or decreasing, e.g., as bellyband 320 expands or shrinks with temperature per its CTE.

Figure 5:
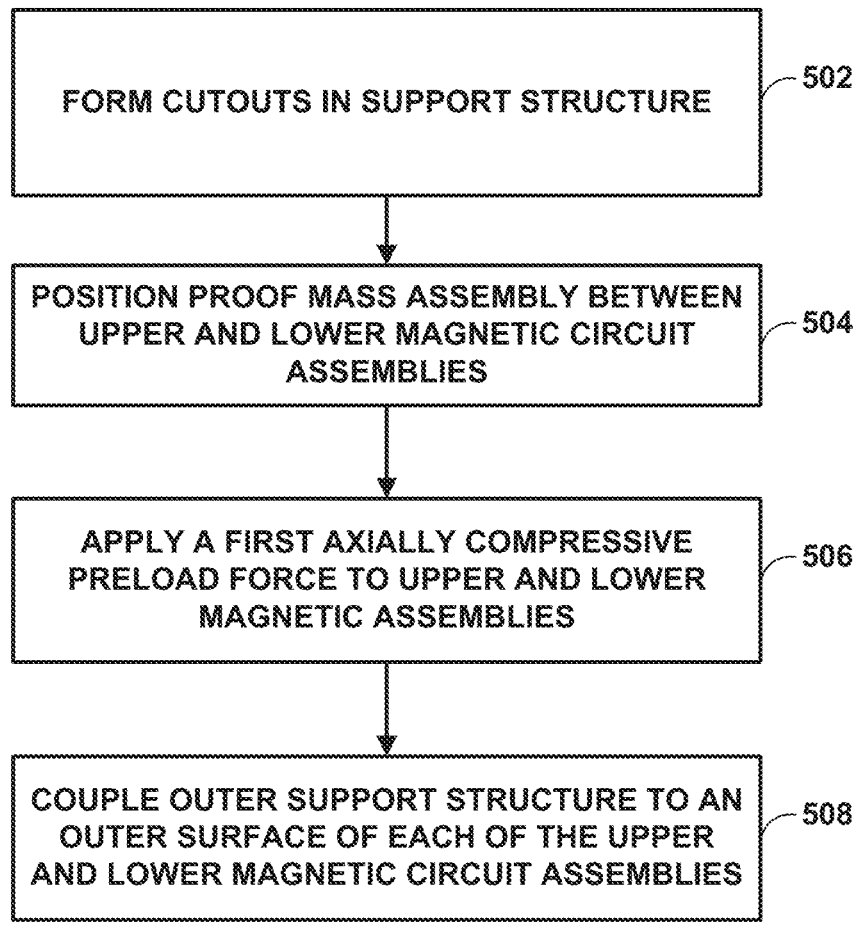
FIG. 5 is a flowchart illustrating an example method of manufacturing a sensor including a stress-relieving outer support structure.

FIG. 5 is a flowchart illustrating an example method of manufacturing a transducer 10 including a stress-relieving outer support structure 120. FIG. 5 will be described with respect to magnetic circuit assemblies 12 and 14 of FIGS. 1-3 and outer support structures (e.g., bellybands) 120, 220, and/or 320 of FIGS. 1-4; however, other magnetic circuit assemblies and/or outer support structures may be formed using the example method of FIG. 5. While certain manufacturing techniques may be further described with respect to certain components, the example method of FIG. 5 may include forming any of magnetic circuit assemblies 12 and 14 and bellybands 120, 220, and/or 320 using a variety of techniques including, but not limited to: casting; molding; additive manufacturing, such as 3D printing; subtractive manufacturing, such as machining; joining, EDM, cutting, ablating; and the like.

A manufacturer may form cutouts 126 in bellyband 120 (502). For example, a manufacturer may form bellyband 120 having a nominal circumference out of invar, alloy 42, or any suitable material, and form cutouts 126 via EDM. In some examples, the manufacturer may cut a slit in bellyband 120 to allow the circumference of bellyband 120 to expand to be fit, e.g., press fit or slip fit, onto transducer 10.

The manufacturer may position proof mass assembly 20 between upper and lower magnetic circuit assemblies 12 and 14 (504), and apply a first axially compressive force to the upper and lower magnetic circuit assemblies 12, and 14 (e.g., to upper and lower excitation rings 52) comprising a static force that forces the upper and lower excitation rings axially towards each other (506). In some examples, the first preload force is configured to cause upper and lower excitation rings 52 to contact mounting pads 34, 44 and to maintain contact between upper and lower excitation rings 520 to contact mounting pads 34, 44, e.g., during coupling of bellyband 120.

The manufacturer may couple bellyband 120 to an outer surface of each of upper and lower excitation rings 52 (508). In some examples, the manufacture may then apply a coupling agent, such as a thermal cure epoxy, to both the outer surfaces of upper and lower excitation rings 52 and a surface of bellyband 120, e.g., edges/shoulder 122, 124. The manufacturer may then cure the epoxy at an elevated temperature to cure the epoxy to bond the epoxy to upper and lower excitation rings 52 and bellyband 120, and then allow transducer 10 to come to an ambient temperature, e.g., room temperature. The manufacturer may apply the first preload force and/or form bellyband 120 of a material having a CTE such that, when cooled to ambient, bellyband 120 applies and/or maintains a second axial preload force holding upper and lower excitation rings 52 to mounting pads 34, 44. In some examples, the coupling agent, e.g., epoxy, may have a CTE that is higher than at least one of upper and lower excitation rings 52 or bellyband 120.

Select examples of the present disclosure include, but are not limited to, the following examples.

Example 1: A transducer including: an upper magnetic circuit assembly comprising an upper excitation ring; a lower magnetic circuit assembly comprising a lower excitation ring; a proof mass assembly positioned between the upper and lower magnetic circuit assemblies, wherein a coefficient of thermal expansion (CTE) of the proof mass assembly is lower than a CTE of each of the upper and lower excitation rings; and an outer support structure coupled to an outer surface of each of the upper and lower excitation rings, wherein the outer support structure includes at least one cutout configured to reduce a circumferential stiffness of the outer support structure.

Example 2: The transducer of example 1, wherein each of the upper and the lower magnet circuit assemblies comprises: a magnet overlying the respective excitation ring; and a pole piece overlying the magnet.

Example 3: The transducer of example 1 or example 2, wherein the outer support structure is configured to reduce a radial hoop stress applied by the outer support structure on the outer surfaces of each of the upper and lower excitation rings.

Example 4: The transducer of any one of examples 1 through 3, wherein the proof mass assembly comprises: a proof mass; a proof mass support structure surrounding the proof mass; a flexure connecting the proof mass to the proof mass support structure; and at least one mounting pad positioned between the proof mass support structure and one of the upper or lower excitation rings, wherein the at least one cutout is located at a circumferential position of the outer support structure that does not coincide with the at least one mounting pad.

Example 5: The transducer of example 4, wherein the at least one cutout comprises a plurality of slits separating the outer support structure into two or more circumferential sections.

Example 6: The transducer of example 4 or example 5, wherein the at least one mounting pad comprises a plurality of mounting pads, and wherein the at least one cutout is circumferentially positioned substantially equidistant between two mounting pads of the plurality of mounting pads.

Example 7: The transducer of any one of examples 1 through 6, wherein the outer support structure is configured to retain an axial distance between each of the upper and lower magnet assemblies and the proof mass assembly.

Example 8: The transducer of any one of examples 1 through 7, wherein the at least one cutout is formed in the outer support structure via wire electrical discharge machining (EDM).

Example 9: The transducer of any one of examples 1 through 8, wherein the at least one cutout comprises: a first cutout extending from a first axial side of the outer support structure and having a first axial length that is less than the full axial length of the outer support structure; and a second cutout extending from a second axial side of the outer support structure opposite the first axial side and having second axial length that is less than the full axial length of the outer support structure.

Example 10: The transducer of example 9, wherein the first cutout is separated from the second cutout by a circumferential distance without any intervening cutouts.

Example 11: The transducer of example 9 or example 10, wherein the first axial length and the second axial length are at least 50% of the full axial length of the outer support structure.

Example 12: The transducer of any one of examples 1 through 11, wherein the outer support structure is a bellyband comprising Invar, wherein the bellyband is coupled to the outer surface of each of the upper and lower excitation rings by a thermally curable epoxy, wherein the proof mass assembly comprises quartz.

Example 13: A bellyband including: an outer support structure configured to couple to an outer surface of each of an upper excitation ring and a lower excitation ring of a transducer comprising a proof mass assembly positioned between the upper and lower excitation rights, wherein a coefficient of thermal expansion (CTE) of the proof mass assembly is lower than a CTE of each of the upper and lower excitation rings, wherein the outer support structure includes at least one cutout configured to reduce a circumferential stiffness of the outer support structure.

Example 14: The bellyband of example 13, wherein the outer support structure is configured to reduce a radial hoop stress applied by the outer support structure on the outer surfaces of each of the upper and lower excitation rings.

Example 15: The bellyband of example 13 or example 14, wherein the proof mass assembly comprises: a proof mass; a proof mass support structure surrounding the proof mass; a flexure connecting the proof mass to the proof mass support structure; and at least one mounting pad positioned between the proof mass support structure and one of the upper or lower excitation rings, wherein the at least one cutout is located at a circumferential position of the outer support structure that does not coincide with the at least one mounting pad.

Example 16: The bellyband of any one of examples 13 through 15, wherein the at least one cutout comprises a plurality of slits separating the outer support structure into two or more circumferential sections.

Example 17: The bellyband of any one of examples 13 through 16, wherein the outer support structure is configured to retain an axial distance between each of the upper and lower magnet assemblies and the proof mass assembly.

Example 18: The bellyband of any one of examples 13 through 17, wherein the at least one cutout is formed in the outer support structure via wire electrical discharge machining (EDM).

Example 19: The bellyband of any one of examples 13 through 18, wherein the at least one cutout comprises: a first cutout extending from a first axial side of the outer support structure and having a first axial length that is less than the full axial length of the outer support structure; and a second cutout extending from a second axial side of the outer support structure opposite the first axial side and having second axial length that is less than the full axial length of the outer support structure.

Example 20: The bellyband of any one of examples 13 through 19, wherein the outer support structure comprises Invar, wherein the outer support structure is configured to be coupled to the outer surface of each of the upper and lower excitation rings by a thermally curable epoxy, wherein the proof mass assembly comprises quartz.

Various examples have been described. These and other examples are within the scope of the following claims.

What is claimed is:

1. A transducer, comprising:
   an upper magnetic circuit assembly comprising an upper excitation ring;
   a lower magnetic circuit assembly comprising a lower excitation ring;
   a proof mass assembly positioned between the upper and lower magnetic circuit assemblies, wherein a coefficient of thermal expansion (CTE) of the proof mass assembly is lower than a CTE of each of the upper and lower excitation rings; and
   an outer support structure in contact with an outer surface of each of the upper and lower excitation rings, wherein the outer support structure includes at least one cutout extending from an axial edge of the outer support structure with an axial length less than the full axial length of the outer support structure and configured to reduce a circumferential stiffness of the outer support structure.

2. The transducer of claim 1, wherein each of the upper and the lower magnet circuit assemblies comprises:
   a magnet overlying the respective excitation ring; and
   a pole piece overlying the magnet.

3. The transducer of claim 1, wherein the outer support structure is configured to reduce a radial hoop stress applied by the outer support structure on the outer surface of each of the upper and lower excitation rings.

4. The transducer of claim 1, wherein the proof mass assembly comprises:
   a proof mass;
   a proof mass support structure surrounding the proof mass;
   a flexure connecting the proof mass to the proof mass support structure; and
   at least one mounting pad positioned between the proof mass support structure and one of the upper or lower excitation ring,
   wherein the at least one cutout is located at a circumferential position of the outer support structure that does not coincide with the at least one mounting pad.

5. The transducer of claim 4, wherein the at least one cutout comprises a plurality of slits separating the outer support structure into two or more circumferential sections.

6. The transducer of claim 4, wherein the at least one mounting pad comprises a plurality of mounting pads, and wherein the at least one cutout is circumferentially positioned substantially equidistant between two mounting pads of the plurality of mounting pads.

7. The transducer of claim 1, wherein the outer support structure is configured to retain an axial distance between each of the upper and lower magnet assemblies and the proof mass assembly.

8. The transducer of claim 1, wherein the at least one cutout is formed in the outer support structure via wire electrical discharge machining (EDM).

9. The transducer of claim 1, wherein the at least one cutout comprises:
   a first cutout extending from a first axial side of the outer support structure and having a first axial length that is less than the full axial length of the outer support structure; and
   a second cutout extending from a second axial side of the outer support structure opposite the first axial side and having a second axial length that is less than the full axial length of the outer support structure.

10. The transducer of claim 9, wherein the first cutout is separated from the second cutout by a circumferential distance without any intervening cutouts.

11. The transducer of claim 9, wherein the first axial length and the second axial length are at least 50% of the full axial length of the outer support structure.

12. The transducer of claim 1, wherein the outer support structure is a bellyband comprising Invar, wherein the bellyband is coupled to the outer surface of each of the upper and lower excitation rings by a thermally curable epoxy, wherein the proof mass assembly comprises quartz.

13. A bellyband comprising:
   an outer support structure configured to be in contact with and couple to an outer surface of each of an upper excitation ring and a lower excitation ring of a transducer comprising a proof mass assembly positioned between the upper and lower excitation rings, wherein a coefficient of thermal expansion (CTE) of the proof mass assembly is lower than a CTE of each of the upper and lower excitation rings,
   wherein the outer support structure includes a plurality of cutouts separating the outer support structure into two or more circumferential sections and configured to reduce a circumferential stiffness of the outer support structure.

14. The bellyband of claim 13, wherein the outer support structure is configured to reduce a radial hoop stress applied by the outer support structure on the outer surfaces of each of the upper and lower excitation rings.

15. The bellyband of claim 13, wherein the proof mass assembly comprises:
   a proof mass;
   a proof mass support structure surrounding the proof mass;
   a flexure connecting the proof mass to the proof mass support structure; and
   at least one mounting pad positioned between the proof mass support structure and one of the upper or lower excitation ring, wherein the at least one cutout is located at a circumferential position of the outer support structure that does not coincide with the at least one mounting pad.

16. The bellyband of claim 13, wherein the outer support structure is configured to retain an axial distance between each of the upper and lower excitation rings and the proof mass assembly.

17. The bellyband of claim 13, wherein the plurality of cutouts is formed in the outer support structure via wire electrical discharge machining (EDM).

18. The bellyband of claim 13, wherein the plurality of cutouts comprises:
   a first cutout extending from a first axial side of the outer support structure and having a first axial length that is less than a full axial length of the outer support structure; and
   a second cutout extending from a second axial side of the outer support structure opposite the first axial side and having second axial length that is less than a full axial length of the outer support structure.

19. The bellyband of claim 13, wherein the outer support structure comprises Invar, wherein the outer support structure is configured to be coupled to the outer surface of each of the upper and lower excitation rings by a thermally curable epoxy, wherein the proof mass assembly comprises quartz.

20. The transducer of claim 1, wherein an axial length of the at least one cutout is at least 50% of the full axial length of the outer support structure.

* * * * *